Patented Aug. 18, 1931

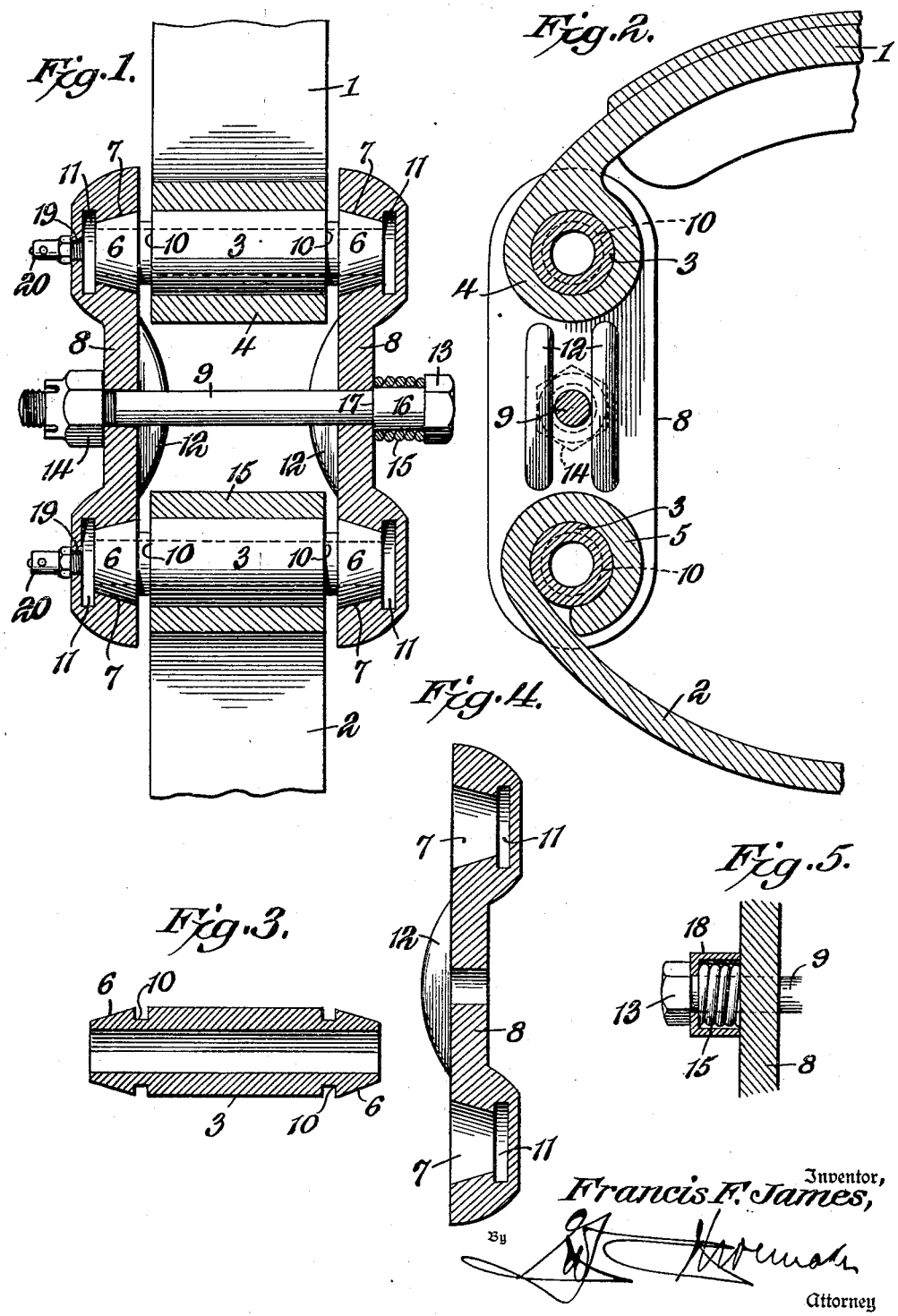

1,819,176

UNITED STATES PATENT OFFICE

FRANCIS F. JAMES, OF PHILADELPHIA, PENNSYLVANIA

AUTOMATICALLY ADJUSTABLE CONNECTION FOR SHACKLE BOLTS

Original application filed July 20, 1928, Serial No. 294,154. Divided and this application filed July 10, 1929. Serial No. 377,312.

The invention relates to an automatically adjustable connection for shackle bolts, and is a division of an application filed by on or about July 20, 1928, Serial Number 294,154.

The object of the present invention is to improve the construction of shackle bolt connections and to provide an automatically adjustable shackle bolt of simple, practical and comparatively inexpensive construction which will present great strength and durability and which will be adapted to be readily applied to the springs of automobiles and other vehicles.

A further object of the invention is to provide an automatically adjustable shackle bolt connection of this character equipped with cone bearings and adapted to take up the wear without liability of forming shoulders in the cone bearings.

A further object of the invention is to provide an automatically adjustable shackle bolt connection equipped with means for permitting a limited lateral movement of the side plates of the shackle bolt connection and adapted to positively limit the separation thereof so that there will be no liability of the plates spreading too far and permitting the shackle bolts to drop out.

With these and other objects in view, the invention consists in the construction and novel combination and arrangement of parts hereinafter described, illustrated in the accompanying drawings, and set forth in the claims hereto appended, it being understood that various changes in the form, proportion and minor details of construction, within the scope of the claims, may be resorted to without departing from the spirit of the invention or sacrificing any of the advantages thereof.

In the accompanying drawings:

Figure 1 is a transverse sectional view of an adjustable shackle bolt connection constructed in accordance with this invention, and shown applied to two vehicle springs.

Fig. 2 is a longitudinal sectional view of the same.

Fig. 3 is a detailed sectional view of one of the double cone shackle pivots.

Fig. 4 is a detailed sectional view of one of the shackle plates.

Fig. 5 is a detailed sectional view showing another form of stop for positively limiting the separation of the shackle plates.

In the accompanying drawings, in which is illustrated the preferred embodiment of the invention, the adjustable shackle bolt connection is applied to the adjacent ends of two vehicle springs 1 and 2. The shackle bolt connection comprises upper and lower single piece shackle bolts or pivots 3 having central cylindrical portions which are arranged in eyes 4 and 5 of the vehicle springs 1 and 2. The shackle bolts 3 are provided with outwardly tapered cone terminal portions 6 which are arranged in cone bearing recesses 7 of shackle plates 8 located at opposite sides of the springs and connected at an intermediate point between the shackle bolts by a central bolt 9.

The shackle bolts 3 are tubular, and they are provided with circumferential grooves 10 located between the ends of the central cylindrical portions of the shackle bolts and the adjacent ends of the cone portions 6 and adapted to prevent the formation of shoulders on the shackle bolts and in the cone recesses 7, thereby insuring proper engagement with the cone bearings 6. The tubular shackle bolts permit the lubricant to pass through the shackle bolts from one cone bearing to the other, and the shackle plates are provided at the reduced end of the cone bearing recesses 7 with cylindrical enlargements 11 which provide the necessary space for the relative adjustment of the shackle bolts and shackle plates to take up the wear without forming shoulders in the shackle plates 8. The enlarged recesses 11 also provide lubricant chambers or spaces to enable the lubricant to readily flow to the cone surfaces and lubricate the same.

When the bearing surfaces wear, the shackle plates are adapted to project at the circumferential grooves 10 without biting into the shackle bolts, and the cones or cone bearing portions 6 are adapted to project into the enlarged recesses 11 without biting into the shackle plates. By this operation the circumferential grooves 10 and the enlargements 11 of the bearing recesses will prevent the formation of shoulders in either the shackle bolts or the shackle plates, and the enlarged recesses perform the double function of preventing the formation of shoulders in the shackle plates and of providing lubricant chambers.

The shackle plates 8 are provided at their side edges with two spaced webs 12 to prevent bending of the shackle plates, and the central connecting bolt 9 passes through the shackle plates between the webs and is provided at one end with a head 13 and at the other end with a nut 14 arranged on the threaded terminal portion of the bolt 9. A coiled spring 15 is disposed on the bolt and is interposed between the head 13 of the bolt and the adjacent shackle plate 8. The spring maintains the shackle plates in tight engagement with the cone portion of the shackle bolts. The central bolt 9 is provided adjacent the head 13 with a cylindrical enlargement 16 forming a shoulder 17 to prevent the shackle plates from spreading beyond their initial adjustment. Instead of providing the shoulder 17 for this purpose, a cap 18 may be arranged on the bolt and interposed between the head 13 thereof and the adjacent shackle plate to form a suitable abutment for the shackle plate and at the same time provide a cap or casing for the coiled spring, as illustrated in Fig. 5 of the drawings.

Lubricant is supplied to the shackle bolt through openings 19 in the outer shackle plate 8. The openings are arranged centrally of the adjacent recesses 11 and are threaded for the reception of screw threads 20, but any other suitable closure may, of course, be employed, and any other suitable means may be provided for supplying the cone bearings with a lubricant.

What is claimed is:

1. An adjustable connection for shackle bolts including a pair of shackle bolts having central cylindrical portions and cone portions and provided with circumferential grooves arranged between the cylindrical portions and the cone portions, said shackle bolts being also adapted to receive on their cylindrical portions the eyes of vehicle springs, shackle plates located at opposite sides of the springs and having tapered bearing recesses fitting over the cone portions of the shackle bolts to form cone bearings, said shackle plates being provided at the ends of the shackle bolts with enlarged recesses, and means for connecting the shackle plates.

2. An adjustable connection for shackle bolts including a pair of shackle bolts having central cylindrical portions and cone portions and provided with circumferential grooves arranged between the cylindrical portions and the cone portions, said shackle bolts being also adapted to receive on their cylindrical portions the eyes of vehicle springs, shackle plates located at opposite sides of the springs and having tapered bearing recesses fitting over the cone portions of the shackle bolts to form cone bearings, said shackle plates being provided at the ends of the shackle bolts with enlarged recesses, and means independently of the shackle bolts for yieldably connecting the shackle plates and for providing positive means for limiting the separation of the shackle plates.

3. An adjustable connection for shackle bolts including a pair of shackle bolts having central cylindrical portions and cone portions and provided with circumferential grooves arranged between the cylindrical portions and the cone portions, said shackle bolts being also adapted to receive on their cylindrical portions the eyes of vehicle springs, shackle plates located at opposite sides of the springs and having tapered bearing recesses fitting over the cone portions of the shackle bolts to form cone bearings, said shackle plates being provided at the ends of the shackle bolts with enlarged recesses, and a bolt connecting the shackle plates and located between the shackle bolts.

4. An adjustable connection for shackle bolts including a pair of shackle bolts having central cylindrical portions and cone portions and provided with circumferential grooves arranged between the cylindrical portions and the cone portions, said shackle bolts being also adapted to receive on their cylindrical portions the eyes of vehicle springs, shackle plates located at opposite sides of the springs and having tapered bearing recesses fitting over the cone portions of the shackle bolts to form cone bearings, said shackle plates being provided at the ends of the shackle bolts with enlarged recesses, and a bolt connecting the shackle plates and having a spring for yieldably maintaining the shackle plates in contact with the shackle bolts and provided also with means for positively limiting the separation of the shackle plates.

5. An adjustable connection for shackle bolts including a pair of shackle bolts having central cylindrical portions and cone portions and provided with circumferential grooves arranged between the cylindrical portions and the cone portions, said shackle bolts being also adapted to receive on their cylindrical portions the eyes of vehicle springs, shackle plates located at opposite sides of the springs and having tapered bearing recesses fitting over the cone portions of the shackle bolts to form cone bearings, said shackle plates being provided at the ends of the shackle bolts with enlarged recesses, and a bolt connecting the shackle plates and having a spring for yieldably maintaining the shackle plates in contact with the shackle bolts and provided with abutment stops for positively limiting the separation of the shackle plates.

6. An adjustable connection for shackle bolts including a pair of shackle bolts having central cylindrical portions and cone portions and provided with circumferential grooves arranged between the cylindrical portions and the cone portions, said shackle bolts being also adapted to receive on their cylindrical portions the eyes of vehicle springs, shackle plates located at opposite sides of the springs and having tapered bearing recesses fitting over the cone portions of the shackle bolts to form cone bearings, said shackle plates being provided at the ends of the shackle bolts with enlarged recesses, and a bolt connecting the shackle plates and having a spring for yieldably maintaining the shackle plates in contact with the shackle bolts and provided with cylindrical enlargements forming suitable shoulders arranged to positively limit the separation of the shackle plates.

7. The combination with vehicle springs having spaced cylindrical eyes, of an automatically adjustable connection for shackle bolts including a pair of tubular shackle bolts having central cylindrical portions arranged in the eyes of the said springs, said shackle bolts being provided at the ends of the said eyes with circumferential grooves and having terminal cone portions at the outer sides of the grooves, shackle plates located at opposite sides of the springs and having tapered bearing recesses in the terminal cone portions of the shackle bolts to form cone bearings, said shackle plates being provided at the ends of the shackle bolts with enlarged recesses, means for supplying the cone bearings with a lubricant, and means for connecting the shackle bolts.

8. An adjustable connection for shackle bolts including a pair of shackle bolts having central cylindrical portions and cone portions, said shackle bolts being adapted to receive on their cylindrical portions the eyes of the vehicle springs, shackle plates located at opposite sides of the springs and having tapered bearing recesses fitting over the cone portions of the shackle bolts to form cone bearings, said shackle plates being provided adjacent the ends of the shackle bolts with enlarged recesses, and means for connecting the shackle plates.

9. An adjustable connection for shackle bolts including a pair of shackle bolts having central cylindrical portions and cone portions, said shackle bolts being adapted to receive on their cylindrical portions the eyes of the vehicle springs, shackle plates located at opposite sides of the springs and having tapered bearing recesses fitting over the cone portions of the shackle bolts to form cone bearings, said recesses being of greater diameter than the ends of the shackle bolts in zones adjacent said ends, and means for connecting the shackle plates.

In testimony whereof I have hereunto set my hand.

FRANCIS F. JAMES.